Dec. 25, 1923.  
A. S. BROWN  
EMERGENCY SECTIONAL TIRE  
Filed Sept. 30, 1922  
1,478,885  
2 Sheets-Sheet 2
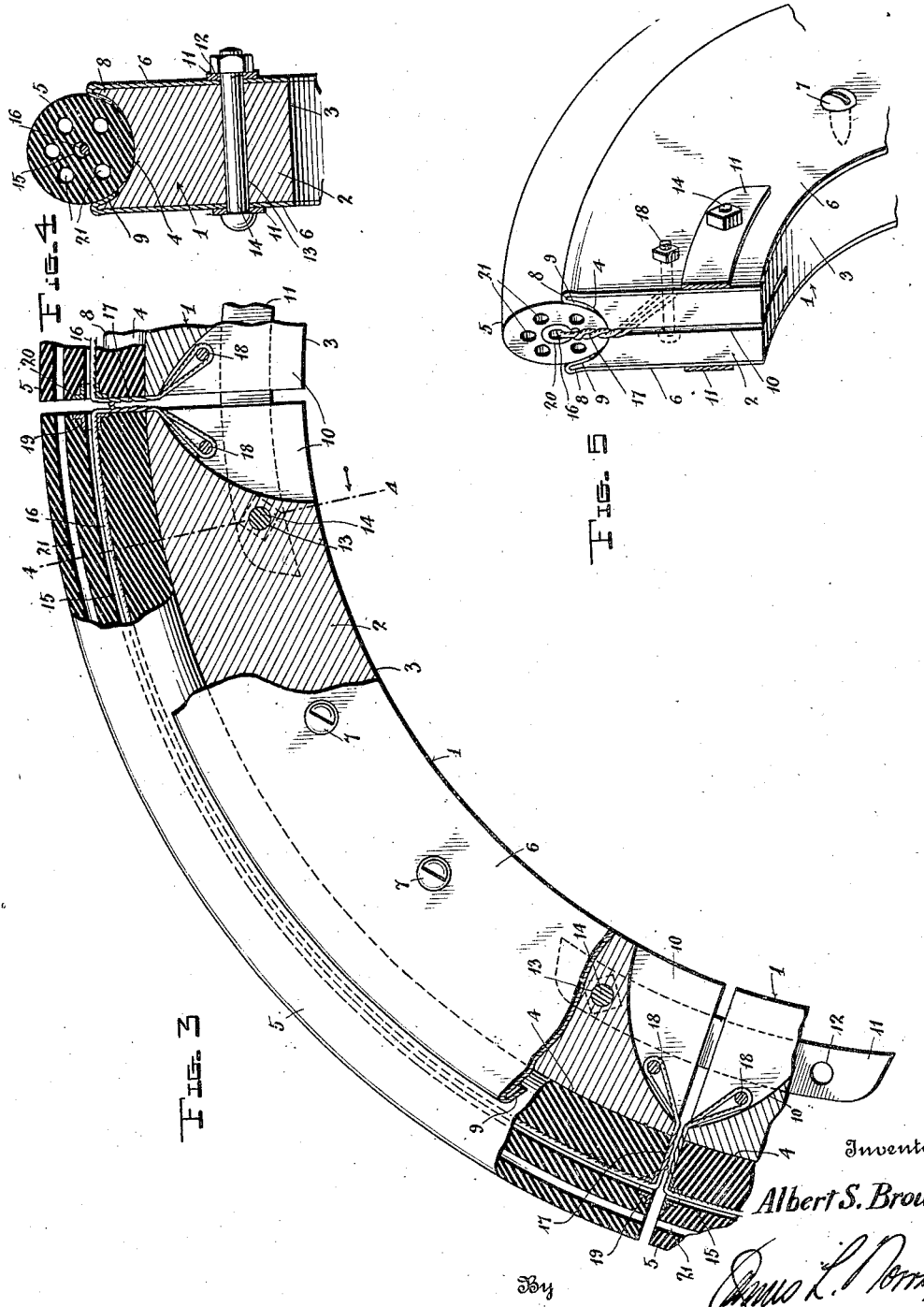
Inventor  
Albert S. Brown,  
By Patented Dec. 25, 1923.

1,478,885

UNITED STATES PATENT OFFICE.

ALBERT S. BROWN, OF OMAHA, NEBRASKA.

EMERGENCY SECTIONAL TIRE.

Application filed September 30, 1922. Serial No. 591,585.

*To all whom it may concern:*

Be it known that ALBERT S. BROWN, a citizen of the United States, residing at Omaha, in the county of Douglas and State of Nebraska, has invented new and useful Improvements in Emergency Sectional Tires, of which the following is a specification.

This invention relates to emergency tires for vehicles and proposes the construction of a tire of the type designated which is separable into short arcuate sections for convenience in storing in small spaces such as the seat compartment of an automobile, said sections being securable together around a wheel rim to form a complete tire.

One of the objects of the invention is the provision of a sectional tire, the inner or rim-engaging part of each section being constructed of rigid material and shod on the outer or traction face with a resilient cushion.

Another object of the invention is the construction of a tire section comprising a rigid rim-engaging part having a recess in its outer or traction face affording a seat for a resilient cushion or shoe, said shoe being provided with a longitudinal bore for the reception of means by which the shoe is fastened to the rigid part of the section, said fastening means being angularly directed at the ends of the resilient shoe and secured to the end faces of the rigid part, the ends of the bore being armored by means of rigid thimbles to protect the shoe from distortion and the tearing action of the fastening means at its angularly directed portion, the thimbles being maintained against accidental displacement by the abutting relation of the adjacent ends of two sections, in the assembled tire, when in use.

With the above and other objects in view, my invention consists in the improved emergency sectional tire illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:

Figure 3 is a side view partly in cross section of a portion of the tire.

Figure 4 is a view of a complete cross section taken in a plane represented by the line 4—4 of Figure 3.

Figure 5 is a perspective view of the end of one section.

Figure 1:
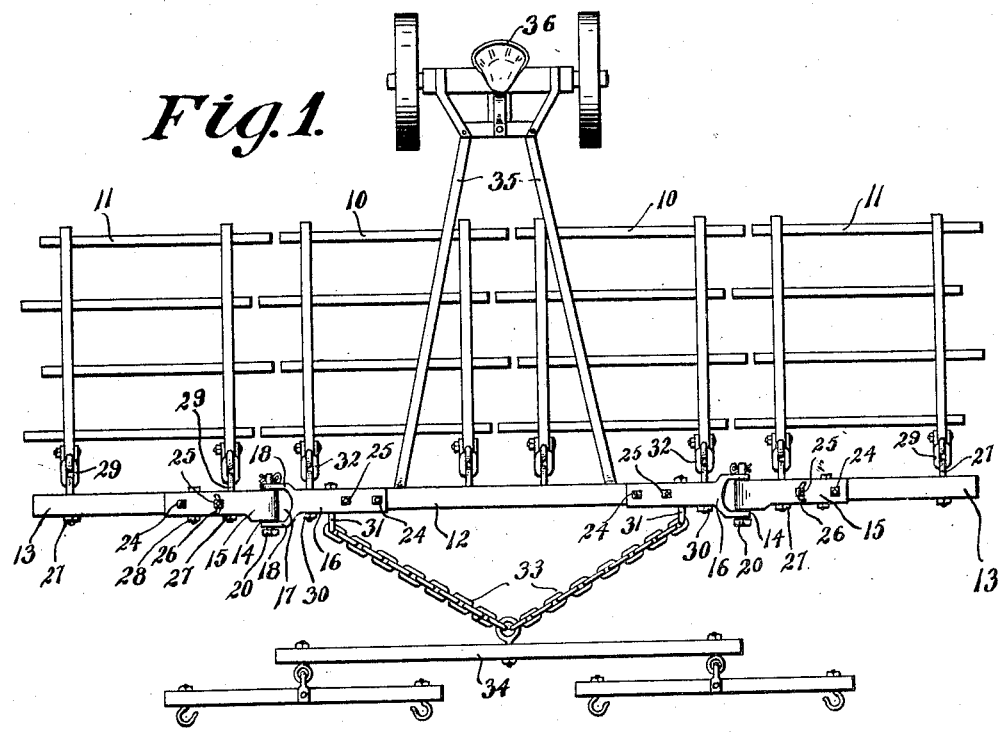
Figure 1 is a side elevation of my improved emergency sectional tire assembled.
Figure 2:
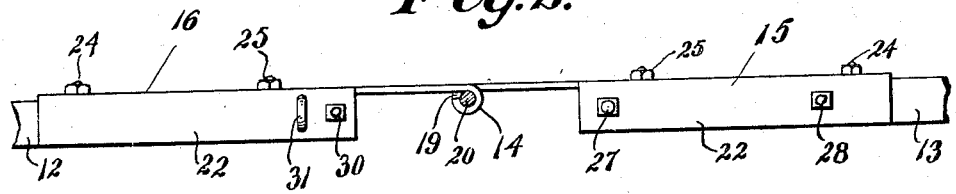
Figure 2 is a transverse section taken along the line 2—2 of Figure 1.

Referring now in detail to the several figures, the numeral 1 represents, in general, one section of the sectional tire which is shown in assembled relation in Figure 1. As here illustrated the tire is composed of five sections, the ends of each section being cut in planes which lie radially of the completed tire, it being obvious that it is well within the spirit of the invention, if desired, to form the tire with a greater or less number of sections.

Each section comprises a rigid arcuate part 2 which may be made of wood or other suitable material and having a flat rim-engaging face 3 and a grooved traction face 4 in which is seated the resilient shoe 5 which is preferably made of rubber. The sides of the rigid part 2 are covered by metallic plates 6, secured thereto by screws 7 and bent over the relatively thin edges 8 of the rigid part adjacent the groove 4 as shown at 9 giving protection to said rigid part from abrasion or other damage due to contact with road-side objects. The ends of the rigid section are inwardly slotted at 10 for the reception of the anchoring wire 16, presently to be described. Adjacent sections of the tire are held together by a pair of lugs 11 which are provided with perforations 12 adapted to align with apertures 13 in the rigid part, through which are passed the bolts 14.

The resilient rubber shoe terminates flush with the ends of the section and is provided with a longitudinal bore 15 through which passes the wire 16 for anchoring the resilient shoe to the rigid part of the tire. The ends 17 of the wire are bent angularly so as to lie in the planes of the ends of the section and are then passed through the slots 10 and secured in tensioned relation to the parts of said section by being twisted around the bolts 18 which intersect the plane of the slots. At the points where the wire 16 is angularly bent at the ends of the resilient shoe, the walls of the bore 15 are reinforced Dec. 25, 1923.

E. BROWN

ATTACHMENT FOR HARROWS

Filed Nov. 2, 1922

1,478,886

2 Sheets-Sheet 1

Earl Brown.
INVENTOR

BY Victor J. Evans
ATTORNEY

WITNESS: